United States Patent

Astle et al.

[11] Patent Number: 5,953,076
[45] Date of Patent: Sep. 14, 1999

[54] SYSTEM AND METHOD OF REAL TIME INSERTIONS INTO VIDEO USING ADAPTIVE OCCLUSION WITH A SYNTHETIC REFERENCE IMAGE

[75] Inventors: Brian Astle; Subhodev Das, both of Princeton, N.J.

[73] Assignee: Princeton Video Image, Inc., Lawrenceville, N.J.

[21] Appl. No.: 08/662,089

[22] Filed: Jun. 12, 1996

Related U.S. Application Data

[60] Provisional application No. 60/000,279, Jun. 16, 1995.

[51] Int. Cl.$^6$ ........................................................ H04N 9/74
[52] U.S. Cl. ............................. 348/584; 348/580; 348/581
[58] Field of Search .................................... 348/580, 581, 348/582, 583, 584, 585, 586, 587, 588, 589, 590, 591, 592

[56] References Cited

U.S. PATENT DOCUMENTS

| | | |
|---|---|---|
| 3,961,133 | 6/1976 | Bennett .................................... 348/586 |
| 4,100,569 | 7/1978 | Vlahos . |
| 4,344,085 | 8/1982 | Vlahos . |
| 5,264,933 | 11/1993 | Rosser et al. . |
| 5,353,392 | 10/1994 | Luquet et al. . |
| 5,400,081 | 3/1995 | Chaplin ................................... 348/587 |
| 5,424,781 | 6/1995 | Vlahos . |
| 5,566,251 | 10/1996 | Hanna et al. ........................... 348/588 |
| 5,646,679 | 7/1997 | Yano et al. .............................. 348/586 |
| 5,649,032 | 7/1997 | Burt et al. ............................... 348/588 |

FOREIGN PATENT DOCUMENTS

WO 95/10919   4/1995   WIPO .............................. H04N 7/18

OTHER PUBLICATIONS

William Pratt, *Digital Image Processing*, John Wiley & Sons, 1991, pp. 292–297.

*Primary Examiner*—Nathan Flynn
*Assistant Examiner*—Vivek Srivastava
*Attorney, Agent, or Firm*—Woodbridge & Associates

[57] ABSTRACT

A system and method for realtime occlusion processing for seamlessly and realistically blending an inserted image such as an advertisement into a region of a live broadcast image without obscuring the action of the live image. The average color and intensity of a synthetic reference image containing at least some of the region to be replaced is compared to the average color and intensity of the current live broadcast image to determine the difference between the two images. The resulting difference image obtained from processing the current image and synthetic, reference image determines areas of the intended insertion region within the current image which are obscured by live action. The processor then generates an occlusion mask based on the difference image and only those pixels that are unoccluded within the intended insertion region are allowed to be inserted into the live broadcast.

29 Claims, 10 Drawing Sheets

| FILTER TYPE | COEFFICIENTS | COEFFICIENT SUMS |
|---|---|---|
| 0 | 64 IMPULSE FUNCTION | 64 |
| 1 | 1 6 1 | 64 |
| 2 | 1 2 1 | 256 |
| 3 | 1 8 14 8 1 | 256 |
| 4 | 1 4 6 4 1 | 256 |
| 5 | 1 7 21 30 21 7 1 | 1024 |
| 6 | 1 6 15 20 15 6 1 | 1024 |

SYSTEM AND METHOD OF REAL TIME INSERTIONS INTO VIDEO USING ADAPTIVE OCCLUSION WITH A SYNTHETIC REFERENCE IMAGE

CROSS-REFERENCE TO RELATED APPLICATIONS

This patent application is related to, and claims the priority of U.S. Provisional Patent Application No. 60/000,279 filed on Jun. 16, 1995 entitled "APPARATUS AND METHOD OF INSERTING IMAGES INTO TELEVISION DISPLAYS" and is related to U.S. patent application Ser. No. 08/563,598 filed Nov. 28, 1995 entitled "SYSTEM AND METHOD FOR INSERTING STATIC AND DYNAMIC IMAGES INTO A LIVE VIDEO BROADCAST", U.S. patent application Ser. No. 08/381,088 filed Jan. 31, 1995 entitled "LIVE VIDEO INSERTION SYSTEM" and to U.S. patent application Ser. No. 08/580,892 filed Dec. 29, 1995 entitled "METHOD OF TRACKING SCENE MOTION FOR LIVE VIDEO INSERTION SYSTEMS". The entire contents of the above mentioned applications are fully incorporated herein by reference.

BACKGROUND OF THE INVENTION

1. Field of the Invention

This invention relates to the improved performance of occlusion processing devices for inserting realistic indicia into video images.

2. Description of the Related Art

Electronic devices for inserting electronic images into live video signals, such as described in U.S. Pat. No. 5,264,933 by Rosser, et al., have been developed and used for the purpose of inserting advertising and other indicia into video, such as sports events. These devices are capable of seamlessly and realistically incorporating logos or other indicia into the original video in real time, even as the original scene is zoomed, panned, or otherwise altered in size or perspective.

Making the inserted indicia look as if they are actually in the scene is an important, but difficult, aspect of implementing the technology. In particular, if an object in the foreground of the actual scene moves in front of the plane in which the inserted object is being positioned, the foreground object must be made to obscure, or partially obscure the insertion in a realistic manner. This aspect of live video insertion technology is termed occlusion processing and has been the subject of previous patent applications.

In U.S. Pat. No. 5,264,933, Rosser et al assumed that a modified version of existing chroma-key or blue screen technology, as described by Kennedy and Gaskins of NBC in *J. Soc. Motion Picture and Television Engineer*, December 1959, pp 804–812 and in U.S. Pat. Nos. 4,100,569 and 4,344,085 and commonly used in television weather forecast programs, would be sufficient to deal with this problem. For a small subset of the intended applications, such as indoor tennis, this is correct. However, chroma-key technology has limitations which restrict the range of applications.

Existing chroma-key or blue screen technology requires a specific range of chroma values to key off, usually a very specific range of blues, and requires that the foreground object does not have any portion with that range of blue values. Inside a studio, with controlled lighting, the range of colors that are keyed off can be very limited. For optimum performance, very specific blues are used in the background and the lighting has to be well controlled. In order to be able to compensate for non-uniformities in the backing color and luminance, the lighting has to be kept constant, as discussed in detail in Valaho's U.S. Pat. No. 5,424,781 "Backing Color and Luminance Nonuniformity Compensation for Linear Image Compositing", which uses stored correction factors developed by comparing the RGB video obtained from the backing before the subject is put in place, with the ideal values of the RGB that would have been obtained from a perfect backing. These correction factors correct the RGB video when the scene is scanned with the subject in place. The technology is usable in the controlled light environment of an indoor sports event, especially if there is freedom to paint the insertion region an exact color. However, in an outdoor sports event changing light conditions are inevitable and simple chroma-key technology would require a wide range of excluded colors. One would both have to alter the color of the insert region of the stadium and make sure that the players involved in the game were not wearing any of the broad range of colors needed to key off. These restrictions severely limit the outdoor applications of a video insertion system relying solely on chroma-key technology for occlusion. The improvements over simple chroma-key technology that are required to make the system robust and usable in a wide variety of variable lighting conditions are the subject of this patent.

Rosser et al. also discuss the possibility of motion tracking of objects or parts of objects. This is possible in events such as auto-racing where the foreground objects are in constant motion. A major difficulty of this approach is events in which the foreground objects are stationary for any length of time, as occurs in a large number of sports.

Other parties have tackled the occlusion problem in other, less robust, ways.

In U.S. Pat. No. 5,353,392, Luquet et al. discuss a method and device for modifying a zone in successive images in which the occlusion is accomplished by having a stored representation of the target panel. This stored representation is then subjected to three transforms—geometric, color/shade and optionally one related to the modulation transfer function. They take an ideal case of the target zone and reposition it to have the correct pose in the current image by a geometrical transform, then make adjustments to the color of the repositioned target panel based on a mathematical color transform. The color transform is not clearly described in the patent, but appears to consist of observing the color changes of a selected number of well defined points and then doing a linear interpolation in color space to alter the color values of all other pixels. The decision on whether the insertion is occluded or not is then done on a pixel by pixel basis, where it is assumed that any pixels of the transformed stored representation that differ from the current scene represent something other than the target panel, i.e. they are an obstacle interposed between the camera and the panel. That set of points that are different constitute a mask associated with the obstacle. The inlay or insertion is then not done in the region of that set of points, on a pixel by pixel basis, for opaque objects, or that set is used to modify the pattern before inlaying, on a pixel by pixel basis, for semi-opaque objects.

Luquet et al. also discuss the possibility of time filtering the color transform to reduce noise, and the possibility of using cameras with at least four spectral bands, rather than the conventional three. The fourth band they propose would be in the near infrared frequency spectrum.

The main problem with the approach suggested by Luquet is that it relies on pixel accurate warping, both for the geometric image and as the starting point for the color transform. In any practical system there are bound to be errors, especially if the insertion system is well down stream of the originating camera, due to noise in the video and other practical issues such as lens distortions. The method of adaptive occlusion with a simple synthetic reference image that is the subject of the present patent application offers a robust alternative that does not require special cameras or the delays associated with time averaging.

Sharir and Tamir, in their PCT application WO 95/10919, discuss an apparatus and method for detecting, identifying and incorporating advertisements in video in which the occlusion is done in the following steps:

1. Subtract sign image in the video field from its perspective transformed model
2. Filter internal edge effects from difference image
3. Identify large non-black areas in difference image as occlusion areas
4. Temporally smooth occlusion map Additionally, in replacing the image, the application proposes implementing anti-aliasing procedures. Sharir and Tamir also talk of using motion detection to identify objects that move from the background, or to use texture and geometric shape to distinguish objects from the background. Their proposed method not only requires pixel perfect warping, which is unlikely in a real, noisy video stream, but makes no adjustment for illumination changes between their reference image and the current image. The motion detection will suffer from the same drawbacks as discussed above with respect to the Rosser patent. Sharir and Tamir do not give any details of how they propose, in practice, to make use of texture or geometry to compensate for occlusion.

In sum, the existing state of the art either uses a simplistic modification of the blue screen technique, which would only be acceptable in a limited sub-set of controlled illumination environments, or a more sophisticated system of comparing the image to a suitably warped and color corrected reference image. The practical problem of comparing the current image to a transformed reference image is that slight errors in the warping and color correction can result in unacceptable performance of the occlusion processing system.

The present invention overcomes these difficulties by using adaptive occlusion with a synthetic reference image. This system is usable in varying light conditions, and allows insertion with occlusion on surfaces which are reasonably uniform in color and texture. Such surfaces include, for example, tennis courts, vertical walls, e.g. the padding behind home plate on a baseball field, or even moderately textured reasonably flat surfaces like grass or artificial turf on a soccer or football stadium.

With modifications, which will be discussed in detail in the body of this application, adaptive occlusion with a synthetic reference image can handle occlusion on stationary pattern backgrounds with complex patterns of both low and high contrast, such as advertising billboards in a stadium. By stationary-pattern, it is meant that there is no internal motion within the background region, not that the background is stationary. An example of a stationary-pattern background is a camera panning past an existing advertising billboard.

SUMMARY OF THE INVENTION

The invention comprises a method of real time insertion of a video image into a live video broadcast using adaptive occlusion with a synthetic reference image. This system is usable in varying light conditions, and allows insertion with occlusion on surfaces which are reasonably uniform in color and texture, such as tennis courts, the wall behind home plate on a baseball field, or even grass or turf on a soccer or football stadium.

The present application utilizes the term reference image in a different manner from the following previous related applications: U.S. Provisional Application No. 60/000,279 filed Jun. 16, 1995 entitled "APPARATUS AND METHOD OF INSERTING IMAGES INTO TELEVISION DISPLAYS"; U.S. patent application Ser. No. 08/563,598 filed Nov. 28, 1995 entitled "SYSTEM AND METHOD FOR INSERTING STATIC AND DYNAMIC IMAGES INTO A LIVE VIDEO BROADCAST"; U.S. patent application Ser. No. 08/381,088 filed Jan. 31, 1995 entitled "LIVE VIDEO INSERTION SYSTEM"; and U.S. patent application Ser. No. 08/580,892 filed Dec. 29, 1995 entitled "METHOD OF TRACKING SCENE MOTION FOR LIVE VIDEO INSERTION SYSTEMS". In those applications the term reference image was used to describe a collection of coordinate values which signified the conditions of a playing field absent game action and occlusion due to game action. This coordinate representation is also, more properly, called the reference array and is merely a geometric, coordinate-framework used in searching, tracking and placing an advertisement or other indicia into a live broadcast. In this sense the reference image is merely a convenience to help the operator relate to the reference array.

However, in the occlusion processing of the present invention, the system operates on a modified actual image taken prior to the game which is also referred to as the reference image. The image used in occlusion processing is more properly called the occlusion reference image. In the occlusion processing described herein, the occlusion reference image is operated on prior to use by the system, through spatial-filtering, or by the operator manually adjusting pixel values in various regions using well known software tools to generate a simplified variant of the occlusion reference image, properly referred to as a synthetic occlusion reference image.

Instead of a realistic image of the insertion region, the occlusion reference image is a low pass filtered version of the reference image. Typically, lines and other structure in the occlusion reference image are not filtered, but may be entirely removed from the occlusion reference image. In an extreme case, the "reference image" is reduced to a single intensity and color, e.g. one value each for Y,U and V color components. In addition, there are a set of sensor points associated with the insertion region. Usually this set is a grid of points spanning the insertion region, sufficient in number to give a statistical measure of the lighting and coloring of the insertion region.

Both the synthetic reference image and the sensor points are warped (i.e. geometrically transformed) into the correct pose in the current image. The sensor points are used to measure the color and intensity values of the current image. Next, the average value of the sensor points is used to adjust the color and intensity values of the synthetic reference image. The adjusted reference image is then compared with and subtracted from the current image. The resultant difference image is mapped into an occlusion mask via two thresholds, the low-occlusion and the high-occlusion values. All pixels in the difference image that are less then the low-occlusion threshold are assumed to be unoccluded and the mask is set to the maximum transparency value, i.e. the corresponding pixel in the current or live video is completely transparent and the insertion pixel appears instead. All pixels in the difference image whose values lie between the low- and high-occlusion thresholds are made semitransparent in proportion to their position between the low- and high- threshold. All pixels in the difference image whose values lie above the high- threshold, are assumed to be occluded, and are set to minimum transparency (maximum opacity) in the occlusion mask, i.e. the corresponding pixel in the current image is completely opaque and the insertion pixel does not show through at that point.

The low- and high- occlusion thresholds may be operator determined or automatically adjustable. One such example is the noise in the image controllable by, for instance, the variance of the sensor points. Further, these thresholds may be set by some combination of operator and automatic control.

The maximum and minimum opacity values in the mask may similarly be operator determined or automatically adjustable by the computer, related, for instance, to the average correlation values, or some other measure of overall scene brightness.

Prior to use, the occlusion mask generated by the above procedure can be additionally filtered in space or time. A particularly useful filter is a clustering filter. Such a filter recognizes that an occluded pixel is surrounded by other occluded pixels to some extent. By insisting that every occluded pixel have at least one other occluded neighbor pixel, a smoother more noise free mask results.

Because of the filtering of the reference image, and the use of an average value from a number of points for adjustment, the present method is far less sensitive to slight errors in warping or to noise in the video image.

The present invention may be further understood by referring to the following drawings:

DETAILED DESCRIPTION OF THE PREFERRED EMBODIMENTS

During the course of this description like numbers will be used to identify like elements according to the different figures which illustrate the invention.

In the preferred embodiment, the color and intensity values of the various images are measured using the Y, U, and V color component channels. However, the system of this application is not limited to the Y,U, and V color channels only. Other image characteristics such as hue and texture can be implemented in an analogous manner to the Y,U, and V image characteristics of the preferred embodiment. Further, the preferred embodiment is sometimes described as it pertains to a single image characteristic or channel, for instance, the Y color component channel. It should be understood, however, that identical or analogous operations are performed for each image characteristic or channel that the system is configured to use.

Figure 1:
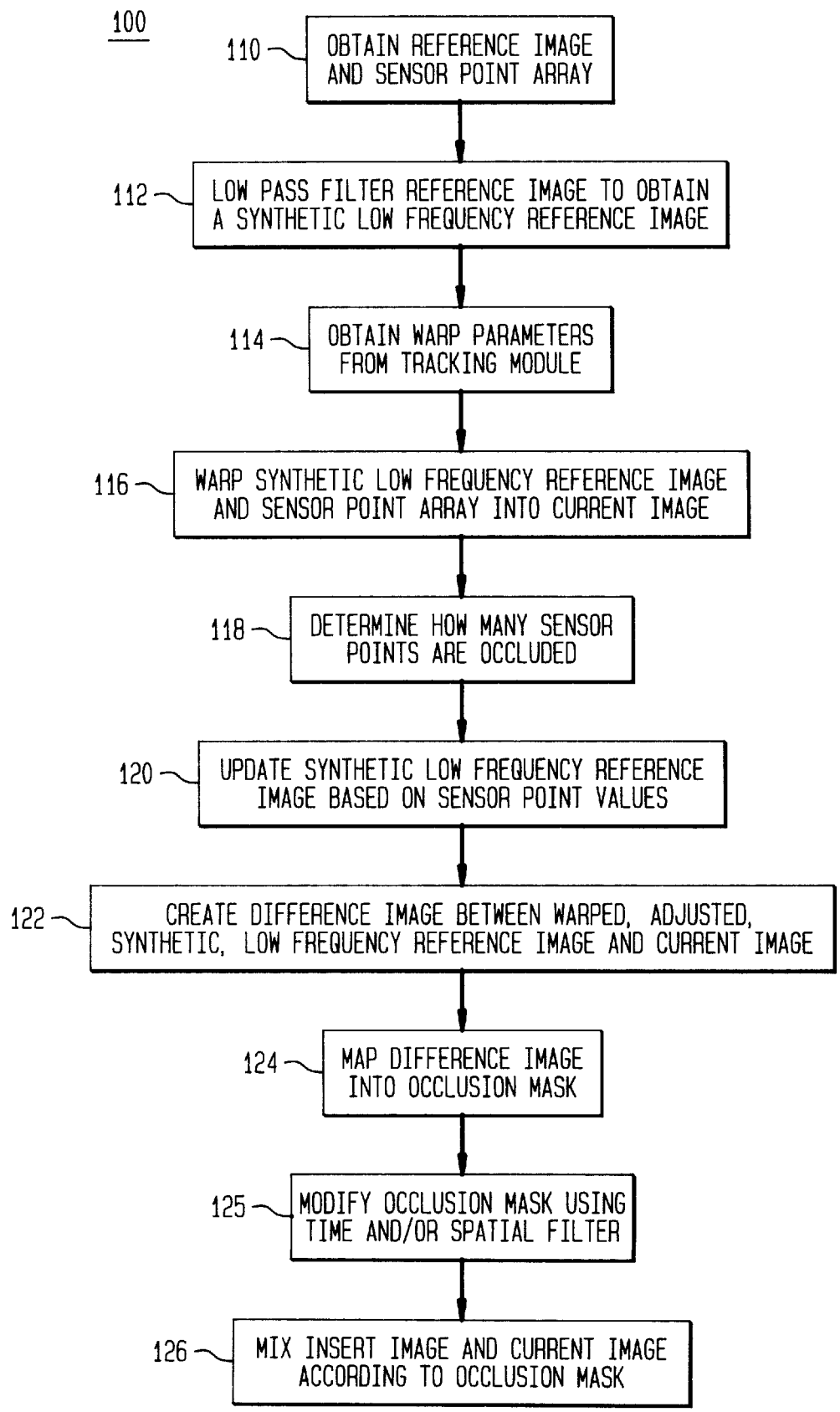
FIG. 1 is a flow diagram outlining the process of adaptive occlusion with a synthetic reference image according to the preferred embodiment of the invention.

The overall method and system of the preferred embodiment of the present invention is illustrated in FIG. 1. First, a reference image and sensor point array is obtained 110 prior to actual broadcast. The reference image is then low pass filtered 112 to create a synthetic, low-frequency version of the original reference image without structure such as lines. Once the synthetic reference image is obtained and stored, the warp parameters relating the current image to the synthetic reference image are obtained 114 from the tracking module. These warp parameters are then used to warp 116 the synthetic reference image into the same pose as the current image. Following warping, the next step is determine how many of the light and color sensitive sensor points have been occluded 118. Based on the perceived changes determined from the sensor points, the synthetic reference image is updated 120 to reflect overall lighting changes that have occurred since the inception of the synthetic reference image. Once updated, a difference image is created 122 highlighting the differences between the updated synthetic reference image and the current image. This difference image is used to create an occlusion mask 124. In the next step, the synthetic reference image is modified depending on local conditions to maximize the quality of the occlusion processing. The mask can be shrunk or spatially filtered depending on conditions. The final mask then determines which pixels of the current image will be broadcast and which pixels of an inserted image will be broadcast. The last step is to mix 126 the inserted image and the current image into a broadcast image based on the occlusion mask.

Figure 3:
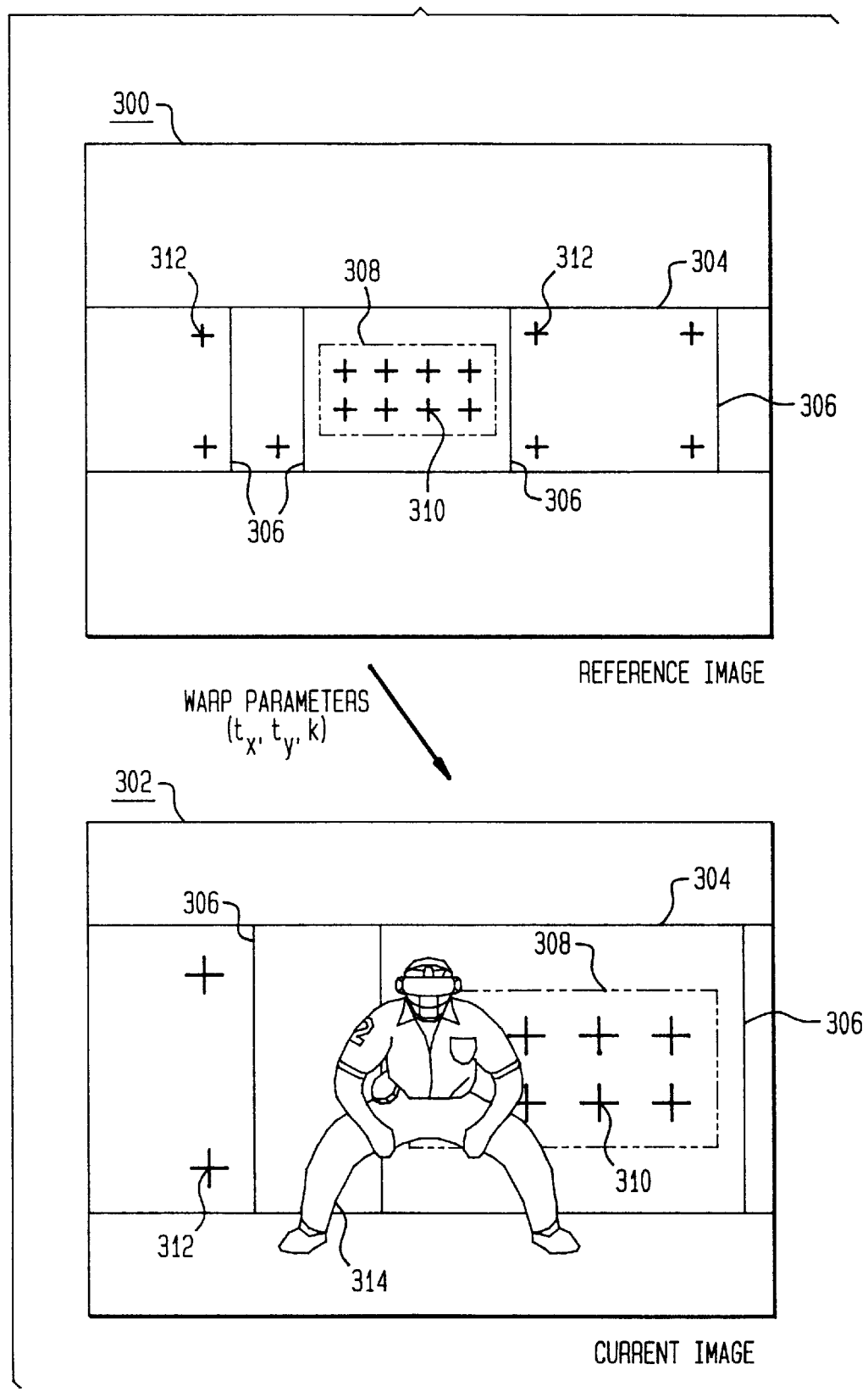
FIG. 3 illustrates a synthetic reference image of a scene about to be warped into a current image of that scene having an occluding object in the foreground where an insertion is to take place according to the preferred embodiment of the invention.

Referring to FIG. 3, adaptive occlusion using a synthetic reference image is a method for determining which parts of an indicia to be inserted into a current field of video 302 should be visible to the end viewer and which parts should be hidden by foreground objects 314, such as players. The synthetic reference image 300, which represents the background objects or structure which the inserted indicia are allowed to obscure or occlude is stored in the system memory. A current image 302, which is a field of video including players and other foreground objects 314, is compared to the synthetic reference image 300 to determine what parts of the insertion region 308 consist of background and what parts consist of foreground.

The first step is to transform the synthetic reference image 300 to have the same pose as the current image 302. This transformation is called warping and the parameters used to effect the transformation are referred to as the warp parameters. This transformation process accounts for current images which are of a different perspective or zoom factor than that of the synthetic reference image. Warp parameters are applied to the synthetic reference image 300 to give it the same size and perspective as the current image 302 so that they may be compared to each other on a pixel to pixel basis.

The second step is to adjust the color and intensity of the warped, synthetic, reference image 300 to reflect current lighting and camera conditions. This is done by monitoring two sets of sensor points 310 and 312. These sensor point locations are predefined points in the synthetic reference image and the current image. The first set, referred to as the array sensor points 310, is an array of points covering the intended region of the insertion 308. A secondary set of sensor points, referred to as the distributed sensor points 312, is a set of points outside the insertion region 308. The purpose of the sensor points is to provide color and luminance information to be used for dynamically adjusting the color and intensity of the pixels in the warped, synthetic reference image. However, the danger is that some or all of the sensor points will become occluded by elements 314 in the current image when warped to their corresponding position in the current image. The system then analyzes all of the sensor points to determine which of them are occluded. This analysis determines whether it is best to use the array sensor points 310 or the distributed sensor points 312 for adjusting the color and intensity of the warped, synthetic reference image.

The next step is to obtain the differences between the current and warped, synthetic reference image that exceed a predetermined threshold. The decision as to what is occluded or not in the current image is done by subtracting the current image and the adjusted synthetic reference image from each other on a pixel by pixel basis. This subtraction is done separately for the different color information components of the image, i.e., the Y, U and V components of the image are subtracted separately along with any other image characteristics that the system is configured for. The difference images are then combined into a single composite difference image, and the differences in that composite image are compared to thresholds to determine which areas are occluded (i.e., consist of a foreground object in the current image, and should, therefore, not have the inserted indicia showing) and which are unoccluded (i.e., consist of background objects in the current image and should, therefore, have the inserted indicia showing). After adjusting the size and smoothing the composite difference image depending on local conditions, this threshold composite difference image is the basis of an occlusion mask or key which is then used to combine or mix the current image and the inserted indicia to form the output.

As previously stated, the system requires a set of warp parameters that relate the current scene 302 of video being examined to a synthetic reference image 300. The simplest set of warp parameters correspond to the horizontal translation, vertical translation, and zoom of the image. Methods for obtaining these warp parameters are well known and discussed in detail in the aforementioned co-pending applications.

In the aforementioned applications, methods for searching and tracking objects are described which allow the extraction of warp parameters which geometrically relate a reference array of coordinates to the current video scene. These warp parameters may be linear, assuming that both the current image and reference frame are parallel planes, or they may be perspective warp parameters. Further, the warp parameters may similarly be limited to translation in the x and y direction, or they may include allowance for relative rotation and shear. The occlusion processing discussed herein works for all the different types of warp parameters which are generally used in image processing.

The synthetic reference image 300 discussed herein is a processed version of a view of the region 308 where an insertion is going to be placed. In general, the processing takes the form of operations to remove unrepresentative objects such as the lines of a tennis court for example. This processing may involve human intervention, i.e. an operator utilizing image processing application software. Processing may also be automated, for instance, in the form of low pass filtering the representative image. Although the filtering may be linear, better results may be obtained with non-linear filters that remove lines without disturbing flat areas. A well known example of such non-linear filtering is median filtering, as described in William Pratt's publication *Digital Image Processing* (John Wiley Sons, Inc., 1991) at pages 292–297. It may also be a hybrid combination of both human intervention and automated linear or non-linear processing, including filtering. In the extreme, the synthetic reference image for an insertion region comprising a fairly flat, fairly uniform area can be reduced to a single set of values indicating the color and intensity of the insertion region.

In doing occlusion processing, the synthetic reference image is compared with the current image as stated above. The occlusion processing can be improved, however, if the current image used for the analysis is itself subject to some pre-processing. For example, low-pass filtering improves the performance of the occlusion processing.

The above described sensor points of the synthetic reference image are a set of geometrical positions which when warped into the current image, give a representative sample of the color and intensity of the region in which the indicia is to be inserted and over which occlusion processing is required. The sensor points themselves may be located anywhere on the image where useful information relating to the insertion region can be gleaned. For instance, in the preferred embodiment, there are two sets of sensor points, the array sensor points 310 inside the insertion region 308, and the distributed sensor points 312, which may be anywhere in the image but for computational convenience are associated with the landmarks used in tracking the scene motion.

Once the synthetic reference image 300 has been warped to the current image 302 the next step is to determine whether and how many sensor points have been occluded. This is done by statistically comparing the color and intensity values of the array sensor points 310 in the current image 302 against the color and intensity values of the corresponding array sensor points 310 in the warped, synthetic reference image 300.

Initially, the base reference average values are the average values of the Y, U and V components of the sensor points in the synthetic reference image. These are called the code sensor average reference average values and are part of a three level system of reference average values referred to as the code, game and tracking. Their use is analogous to the use of code, game and reference average values in the tracking algorithms, discussed in detail in copending application Ser. No. 08/580,892. Briefly, the code reference sensor point average values are loaded into the computer first. The game and tracking reference sensor point average values are set equal to the code reference sensor point average values. At the start of an insertion sequence, the game reference sensor point average values are loaded, and the tracking reference sensor point average values are set equal to the game reference sensor point average values. During an insertion sequence, the tracking reference sensor point average values are updated on a field to field basis.

At the operator's discretion, the game reference sensor point average values may also be adjusted during an insertion sequence to reflect a change in overall lighting conditions, as, for instance, when a baseball game starts in daylight and is then played into the night. Updating the game reference sensor point average values to reflect changing lighting conditions can also be done automatically. In automatic mode updating occurs once during a predetermined time window per tracking sequence, provided a minimum number of landmarks are visible. Automatic updating is referred to as a dynamic game reference and it occurs within a twenty (20) field window centered about the 50$^{th}$ field in a tracking sequence. The new game reference sensor point average values are ⅔rds of the old game reference sensor point average values plus ⅓rd of the current tracking reference sensor point average values.

Figure 4A:
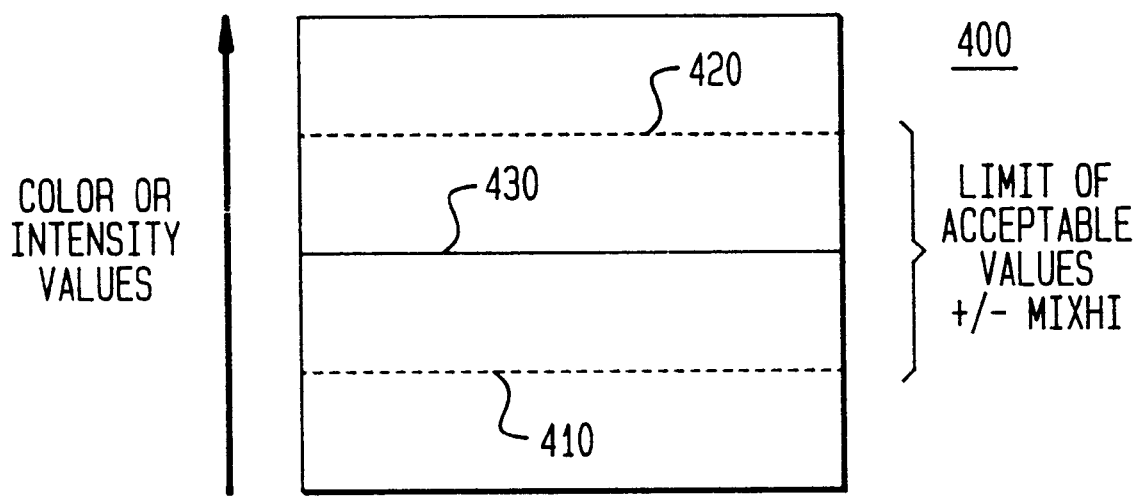
FIG. 4A illustrates the average Y,U, and V values of the array sensor points and the threshold level of acceptable values for individual sensor points according to the preferred embodiment of the invention.

The statistical comparison of the color and intensity values of the array sensor points 310 in the current image 302 is done against the updated tracking reference average values, or, in the case where the insertion sequence is in field 1, against the base reference average values, to determine which of the array points 310 are occluded and therefore invalid for adjusting the current image color and intensity values. As illustrated in FIG. 4A, those sensor points 310 in the current image 302 that lie within a certain threshold 410 and 420 of the tracking reference sensor point average Y,U, and V values 430 are presumed unoccluded, and if there are enough of them, they are used to update the Y, U, and V tracking reference sensor point average values 430. However, if individual points lie outside of a minimum or maximum allowable band, they are assumed to be occluded. In the preferred embodiment, the thresholds defining the range of acceptable values are operator specified, appearing in the controlling computer code as the variables ±MixHi 410 and 420. The acceptable points, i.e. those that lie within the band are then averaged, the average being weighted by the difference of the current sensor points from the updated tracking reference average Y, U, and V values of the sensor points 430. Thus, those unoccluded points which lie closer to the tracking reference average sensor values 430 are weighted greater than those that lie closer to the upper threshold limit, MixHi 420.

Figure 2:
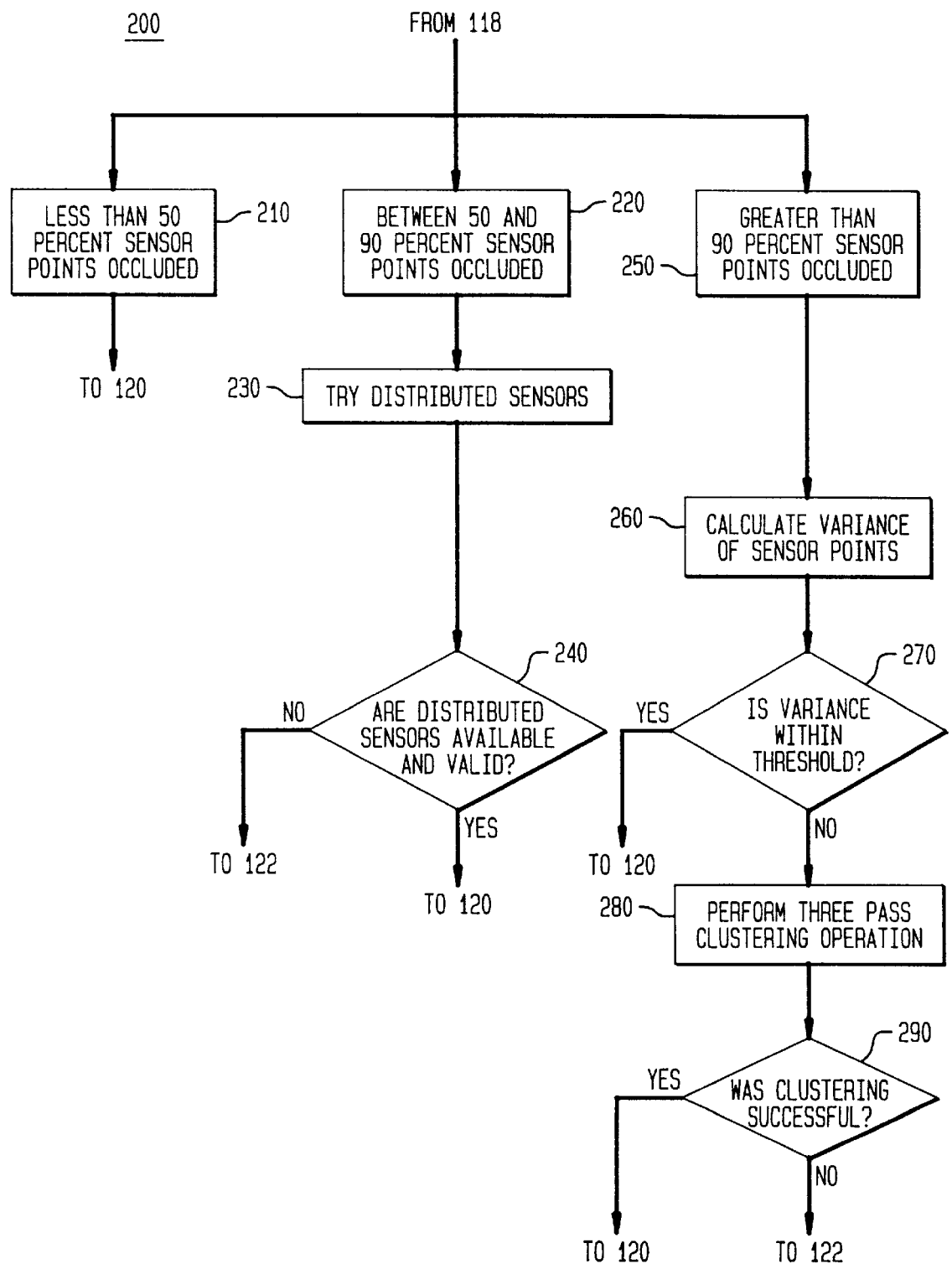
FIG. 2 is a flow diagram illustrating the procedures for adjusting the synthetic reference image based upon the percentage of occluded pixels in the current image according to the preferred embodiment of the invention.

Referring to FIG. 2, in the preferred embodiment if there are more than 50% array sensor points occluded in the current image that lie outside an operator specified threshold 410 and 420, ±MixHi, of the tracking reference average sensor values 430, then one of two steps is taken depending on how many of the array sensor points appear to be occluded.

If more than 50% but less than 90% of the array sensor points 310 are occluded then the distributed sensor points 312 are used to update the tracking reference average sensor values 430, provided enough of the distributed sensors are unoccluded. Should too many of the distributed sensors be occluded then no updating is done for that field.

If more than 90% of the points were considered occluded 250 then a further check is done which consists of calculating the variance 260 of all the sensor points flagged as being occluded. If the variance is comparable 270 to the variance expected from the insertion region, it is assumed that they are in the insertion region, and that there has been a significant change of the lighting or camera settings. An average of the flagged points is calculated, and this is assumed to be the new tracking reference average of the sensor points.

If the variance is not comparable to the expected variance, and no information is available 240 from the distributed sensors, then an attempt is made to use a subset of the sensor points in an operation known as "K-means clustering" 280, using a modified version of the well known K-means clustering operation found, for instance, in C. W. Therrien's "Decision, Estimation and Classification: An Introduction to Pattern Recognition and Related Topics", Wiley, N.Y., 1989 or Duda and Hart "Pattern Classification and Scene Analysis" Wiley, N.Y., 1973. In the preferred embodiment, three passes are made at clustering. If the subset being considered at the end of three passes still doesn't have a variance comparable 290 to the expected variance then the average values from the previous field are used without having been updated.

Next, the updated tracking reference sensor point average values 430 are compared with the average sensor values from the warped, synthetic reference image, and this difference of the average sensor values is used to update the individual color and intensity values of the pixels in the warped, synthetic reference image 300 ready for differencing with the current image 302.

For each unoccluded sensor point, i.e. those that lie within the ±MixHi threshold, a composite difference value, $C_{diff}$, between the current sensor point and its corresponding average tracking reference sensor point is calculated according to:

$$C_{diff} = (w_y(Y_{sensor}-Y_{ave})^2 + w_c((U_{sensor}-U_{ave})^2 + (V_{sensor}-V_{ave})^2))^{1/2}$$

where $Y_{sensor}$ is the luma component of the pixel in the current scene that the sensor point has been warped to, $U_{sensor}$ is the U chroma component of the pixel in the current scene that the sensor point has been warped to, and $V_{sensor}$ is the V chroma component of the pixel in the current scene that the sensor point has been warped to, $Y_{ave}$, $U_{ave}$, $V_{ave}$ are the average values of the luma and chroma components of the sensor points currently stored as the tracking reference sensor point average values and $w_y$ and $w_c$ are operator specified weighting values. Typically, $w_y$ is in the range 0.5 to 2.0 as is $w_c$.

From the composite difference values $C_{diff}$, a weighting value, $W_{sensor}$, is calculated for each sensor point according to the relationships below.

Figure 4B:
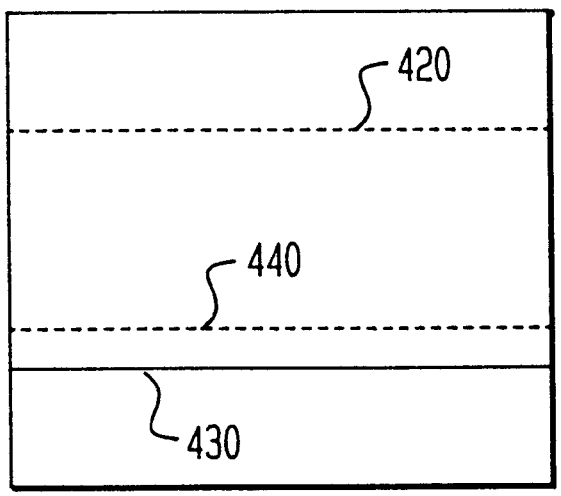
FIG. 4B illustrates the weighting scale for use in determining the weighting values for each sensor point according to the preferred embodiment of the invention.

$w_{sensor} = 0$ when $C_{diff} > \text{MixHi}$, or $$w_{sensor} = \frac{\text{MixHi} - c_{diff}}{\text{MixHi} - \text{MixLo}}$$

when $\text{MixLo} \leq C_{diff} \leq \text{MixHi}$, or $w_{sensor} = 1$ when $C_{diff} < \text{MixLo}$ where MixLo and MixHi are, respectively, the operator supplied thresholds 440 and 420 of FIG. 4B.

The average values of the Y, U, and V components of the unoccluded sensor point values are calculated using the weighting value, $w_{sensor}$, according to the following relationships:

$$Y^i_{ave} = \frac{\sum_{sensors}(w_{sensor} \cdot Y_{sensor})}{\sum_{sensors} w_{sensor}}$$

$$U^i_{ave} = \frac{\sum_{sensors}(w_{sensor} \cdot U_{sensor})}{\sum_{sensors} w_{sensor}}$$

$$V^i_{ave} = \frac{\sum_{sensors}(w_{sensor} \cdot V_{sensor})}{\sum_{sensors} w_{sensor}}$$

The three components of the tracking reference average sensor point values are then updated for the $t^{th}$ field of the current insertion sequence according to the relationships:

$$Y^t_{ave} = f(t)Y^i_{ave} + [1-f(t)]Y^{t-1}_{ave}$$

$$U^t_{ave} = f(t)U^i_{ave} + [1-f(t)]U^{t-1}_{ave}$$

$$V^t_{ave} = f(t)V^i_{ave} + [1-f(t)]V^{t-1}_{ave}$$

where t is the number of fields that have been tracked in the current sequence, $f(1) = 0.95$ and then decrements with time according to the function $f(t) = f(t-1) - 0.01$ limited by the condition that $f(t) \geq 0.04$. For $t = 1$, i.e. the first field in which tracking occurs:

$Y^0_{ave} = Y^{GameRef}_{ave}$
$U^0_{ave} = U^{GameRef}_{ave}$
$V^0_{ave} = V^{GameRef}_{ave}$ These values are then compared with, $Y^{ref}_{ave}$, $U^{ref}_{ave}$, $V^{ref}_{ave}$, the average sensor point values which were calculated from the original warped, synthetic reference image obtained according to the relationships:

$$Y^{ref}_{ave} = \frac{\sum_{sensors} Y^{ref}_{sensor}}{n}$$

$$U^{ref}_{ave} = \frac{\sum_{sensors} U^{ref}_{sensor}}{n}$$

$$V^{ref}_{ave} = \frac{\sum_{sensors} V^{ref}_{sensor}}{n}$$

where $Y^{ref}_{sensor}$, $U^{ref}_{sensor}$, $V^{ref}_{sensor}$ are the Y, U, and V image values for the pixels corresponding to each sensor point and n is the number of sensor points.

Figure 6:
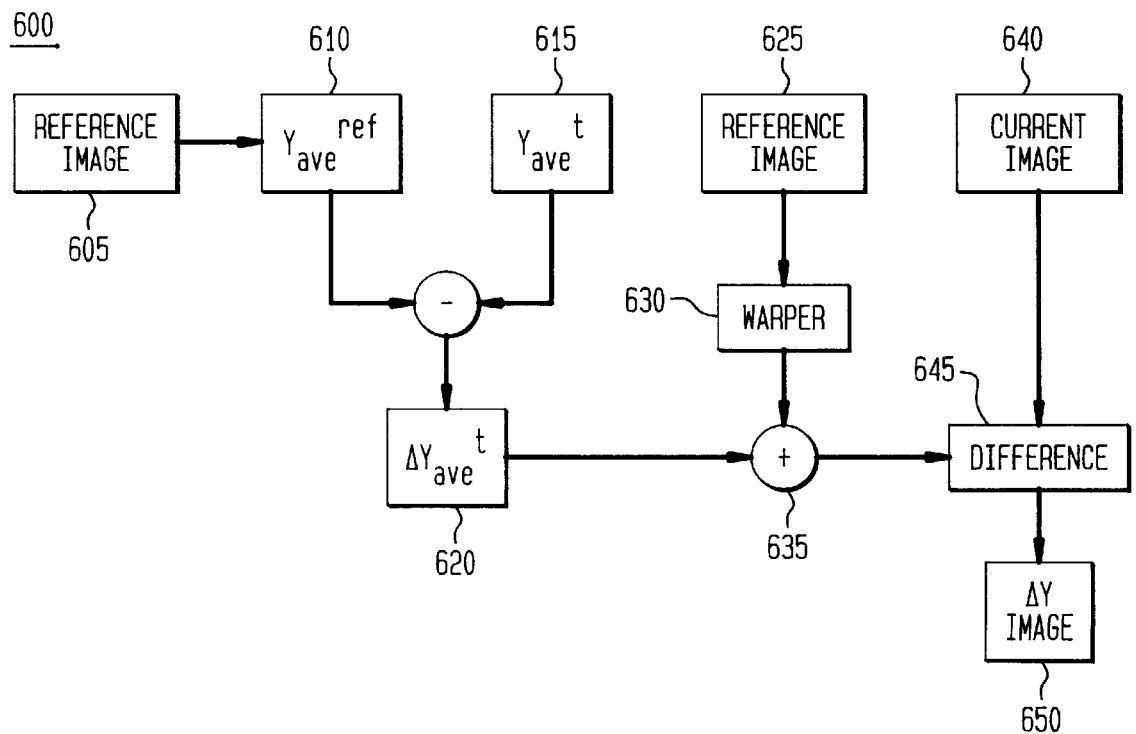
FIG. 6 illustrates the calculation of the difference image for one channel of information diagrammatically according to the preferred embodiment of the invention.

The difference of these equations, i.e. $Y^t_{ave} - Y^{ref}_{ave}$, is then used to uniformly update all pixels of the warped synthetic reference image to reflect the current camera and lighting conditions before obtaining the difference with the current image, as shown diagrammatically in FIG. 6. The reference average of the Y channel 610 is differenced with the current average of the Y channel 615 yielding the current delta average of the Y channel 620. Also, the synthetic reference image 625 is warped 630 and the result is input to combiner 635 where it is combined with the current delta average of the Y channel 620. The current image 640 and the output of combiner 635 are input to difference block 645 where the result is delta Y image 650. Likewise, the same process is performed for the U and V channels to obtain delta U and delta V images.

Once the warped, synthetic reference image has been updated, which in the extreme case means the three values Y, U and V representing the warped synthetic reference image have been altered by the sensor point information, difference images are created. Separate difference images are created for each of the Y, U and V components. For the warped, synthetic reference image, the Y, U and V components of each pixel are adjusted for changing lighting and camera conditions before doing the differencing shown diagrammatically in FIG. 6 according to the following equations:

$$\Delta Y = Y_{current} - ((Y^t_{ave} - Y^{ref}_{ave}) + Y_{ref})$$

$$\Delta U = U_{current} - ((U^t_{ave} - U^{ref}_{ave}) + U_{ref})$$

$$\Delta V = V_{current} - ((V^t_{ave} - V^{ref}_{ave}) + V_{ref})$$

These separate difference images 650 are then combined into one composite difference image. This can be accomplished according to a variety of relationships. The preferred embodiment uses a weighting value for the Y component and a single weighting value for both the U and V components.

$$S = (w_y \Delta Y^2 + w_c(\Delta U^2 + \Delta V^2))^{1/2}$$

where S is the composite difference signal and $w_y$ and $w_c$ are operator selected weighting values. Typically, $w_y$ is set to 1.0 and $w_c$ is set to 1.0, though each may take values in the range 0.0 to 2.0.

Alternative formulations of the composite difference image that can be used, include the form:

$$S = (w_y \Delta Y^2 + w_u \Delta U^2 + w_v \Delta V^2)^{1/2}$$

in which independent weighting values, $w_u$ and $w_v$, are calculated for the U and V difference images. These weighting values may be automatically adjusted to reflect the variance or another statistical measure of the difference values they are related to.

Additionally, the composite difference image may take the form of a choice of the greatest difference from zero of the difference channels being considered, rather than being the Euclidian distance in color space, i.e. S is set equal to the largest of $w_y \Delta Y$, $w_u \Delta U$, or $w_v \Delta V$. In this formulation, different thresholds could be set for positive or negative going total differences, helping in eliminating edge or peaking effects, as shown in FIG. 11.

In addition to the Y, U and V color component channels, other image characteristics can be used to generate the composite difference image. One such characteristic would be to use the hue, i.e the phase angle of the color, arctan (U/V), as one of the channels, either instead of or in addition to the Y, U and V channels.

Another possible image characteristic is texture, which can be utilized, for instance, by creating a variance image comprised of a variance value for each pixel, either with respect to its eight nearest neighbors, or with respect to some average value, which may be determined line by line or from a reference. Just as in the Y, U and V channels, a, synthetic version of the variance image or the hue would be stored, and in the current field a difference version of the variance image or hue image created for use in evaluating occlusion, using equations analogous to those described in the Y, U and V representations of the preferred embodiment.

Figure 11:
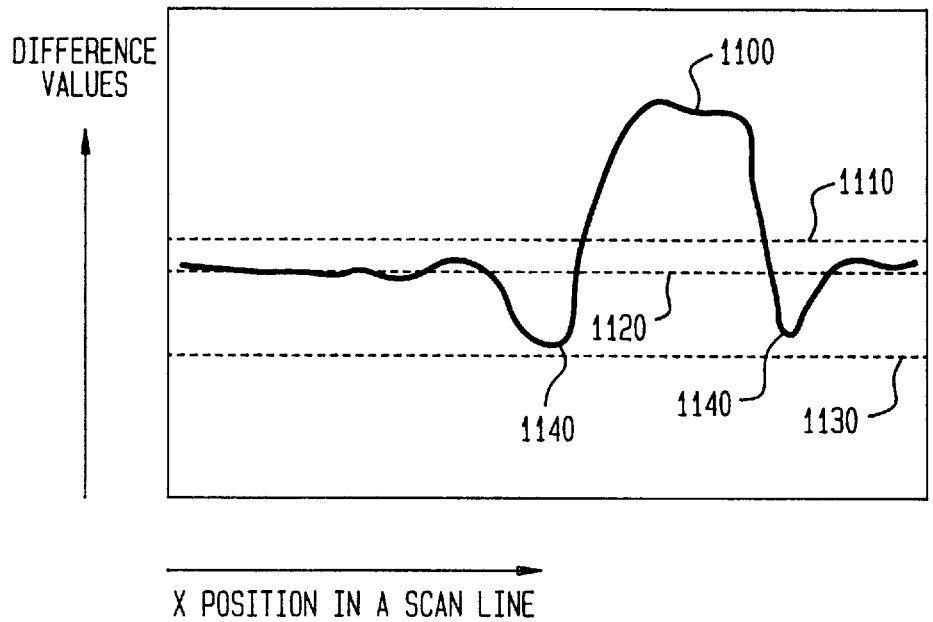
FIG. 11 illustrates the difference value of a single scan line of an information channel according to the preferred embodiment of the invention.

FIG. 11 shows diagrammatically the difference value of a single information channel as a line 1100. This may represent a single scan line of the luma difference image ΔY, or any of the other information channel difference images, e.g. ΔU, ΔV, ΔHue, ΔTexture.

Individual weights may also be adjusted on a pixel by pixel basis using the same or other sources of information such as edge proximity. A particular example is the fact that hue is a very good occlusion discriminator within large objects, but encounters difficulties at sharp transitions, i.e. along the edges of the objects. Thus, the weighting function for the hue component should be related to the pixel position within the reference image to maximize its utility.

The horizontal line 1120 is the zero difference line in that information channel. The positive going threshold line 1110 may be closer to the zero line 1120 than the negative going threshold line 1130, in order to avoid the negative going edge effects 1140, typically caused by camera peaking.

Figures 7, 10:
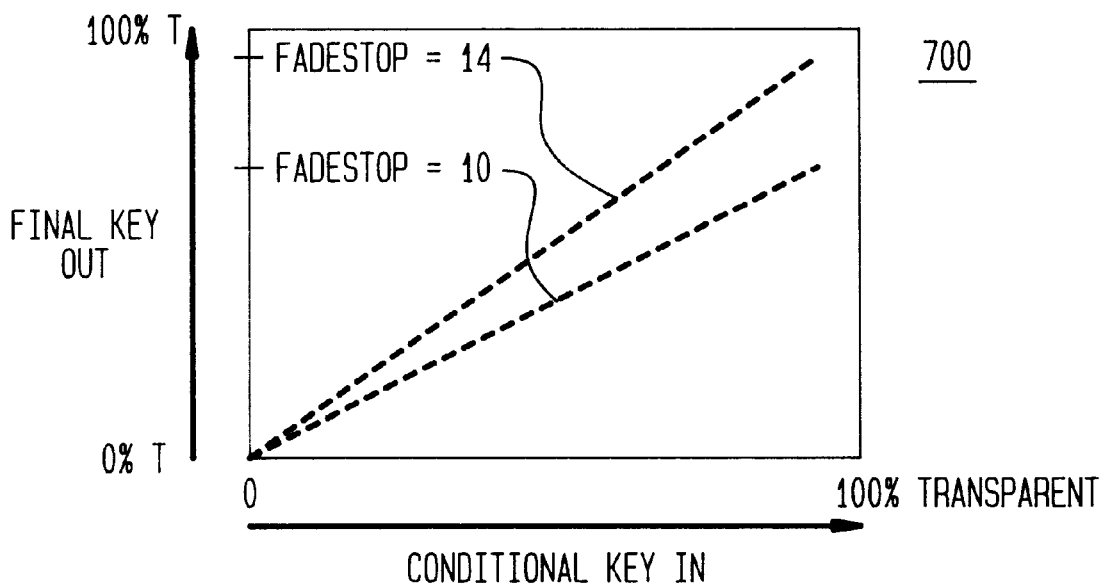
FIG. 7 illustrates the overall transparency adjustment of the conditional key to produce the final key according to the preferred embodiment of the invention.
FIG. 10 is a table showing the low-pass filter coefficients according to the preferred embodiment of the invention.

The resulting composite difference image, regardless of how it is obtained, is then clipped, using user specified values ClipLo and ClipHi, i.e. values lower than ClipLo are set equal to ClipLo and values higher than ClipHi are set equal to ClipHi. Typically, ClipLo is 1 and ClipHi>MixHi. The clipped composite difference image is then filtered with a two dimensional low pass filter. The filter can be selected from a set of one dimensional kernels such as those given in FIG. 10. The low pass filter reduces errors due to noise.

Figure 5:
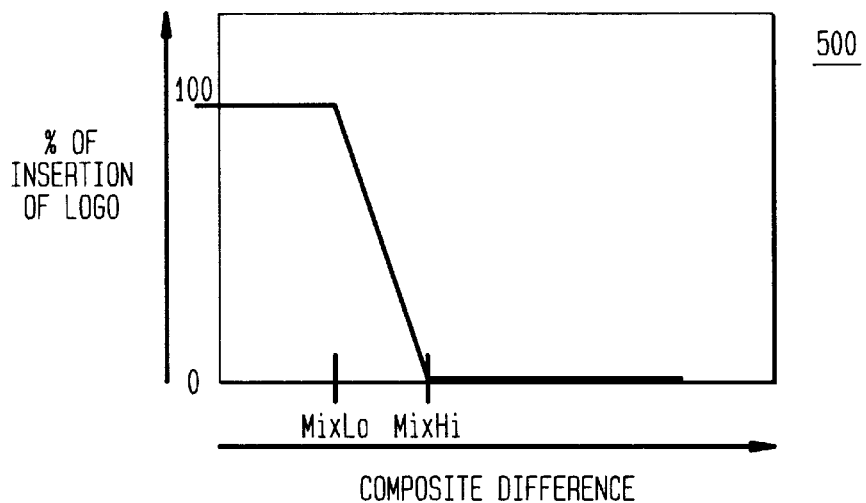
FIG. 5 illustrates the mapping of the composite difference image to the occlusion mask using the MixHi and MixLo occlusion thresholds according to the preferred embodiment of the invention.

After clipping and filtering, the composite difference image is then mapped into an occlusion mask as shown diagrammatically in FIG. 5. The mapping involves two thresholds on the composite difference image, the MixLo threshold and the MixHi threshold. These are operator controlled and in the preferred embodiment are the same values used previously in determining whether the sensor points were occluded or not. All values on the clipped composite difference image less than the MixLo threshold are mapped to the maximum transparency value of the occlusion. The definition of transparency is that if the mask is fully transparent, the insertion will show up. If the mask is opaque, the insertion is occluded, and the pixels from the current video image will show through. All values higher than the MixHi threshold are mapped to minimum transparency on the occlusion mask. For composite difference image pixel values that lie between the MixHi and MixLo occlusion thresholds, there is a linear mapping from the composite difference image to the occlusion mask as shown in FIG. 5.

If necessary, the occlusion mask is also eroded, shrunk, or expanded to compensate for video artifacts such as peaking which artificially change the shape of occluding objects. The occlusion mask is then low-pass filtered using filters described like those in FIG. 10 to smooth off edges. This is desirable for appearance and necessary to avoid introducing high-frequency components into the broadcast video. Although mathematically it may be argued that it should only be necessary to filter the mask once, in practice better results are achieved if there is filtering both before and after the mapping from composite difference image to occlusion mask.

The indicia to be inserted is stored in two parts. One part, referred to as the logo, is a Y,U, and V representation of the desired insertion, typically stored as a full field, 720 by 240 pixel, image. The other part, referred to as the logo key, provides a frame for the logo. The logo key has two primary regions, one of complete transparancy which allows the corresponding regions of the logo (i.e. the Y,U and V representation of the indicia) to be show through to the output video in the absense of occluding objects. The other region is of complete opacity. The edges between the two regions are made soft by filtering, i.e. the transition from opaque to transparent is gradual over two to ten pixels. The logo key is warped using the same parameters used to warp the logo so as to bring both of them into correspondence at the required location in the current image.

The occlusion mask is then combined with the warped logo key to obtain the conditional key. In the preferred embodiment, the conditional key is then operated on for overall transparency adjustment by one more variable, FadeStop, before being used for mixing the insertion into the live video stream. The result of the overall transparency adjustment of the conditional key, is the final key. The overall transparency adjustment is useful since insertions can be made to look more like they are part of the actual scene by allowing a percentage of the actual scene to be mixed into the final image, even when it is unoccluded. For instance, an insertion on the back wall behind home plate in a baseball game looks more as if it is really there if the inserted logo only has a maximum inserted transparency of 70%, i.e. 30% of the actual scene is mixed in to the inserted image, even when unoccluded. This adds texture from the actual scene, helping to create the illusion that the sign is actually on the back wall.

Figure 8:
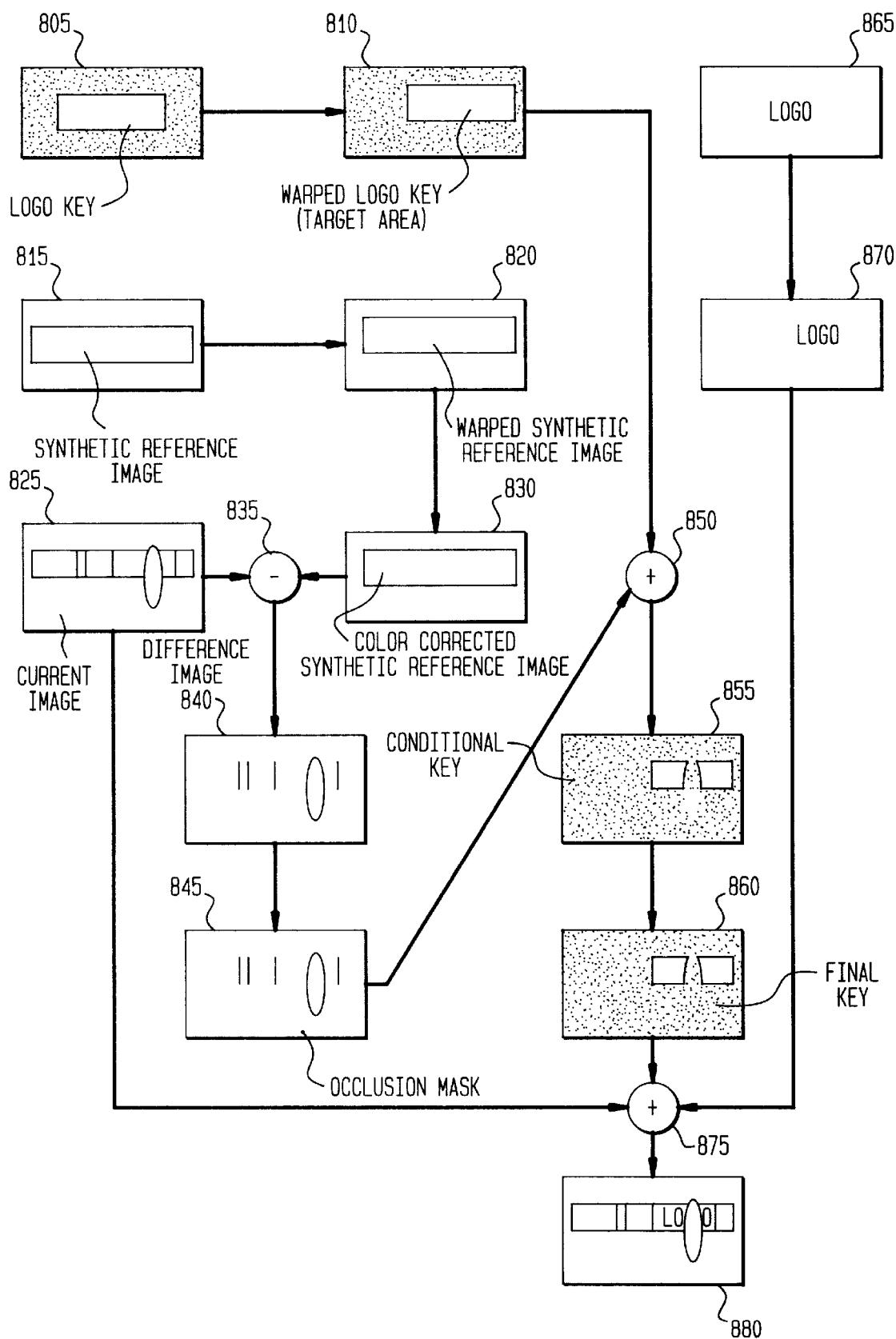
FIG. 8 illustrates the occlusion and insertion process diagrammatically according to the preferred embodiment of the invention.
Figure 9:
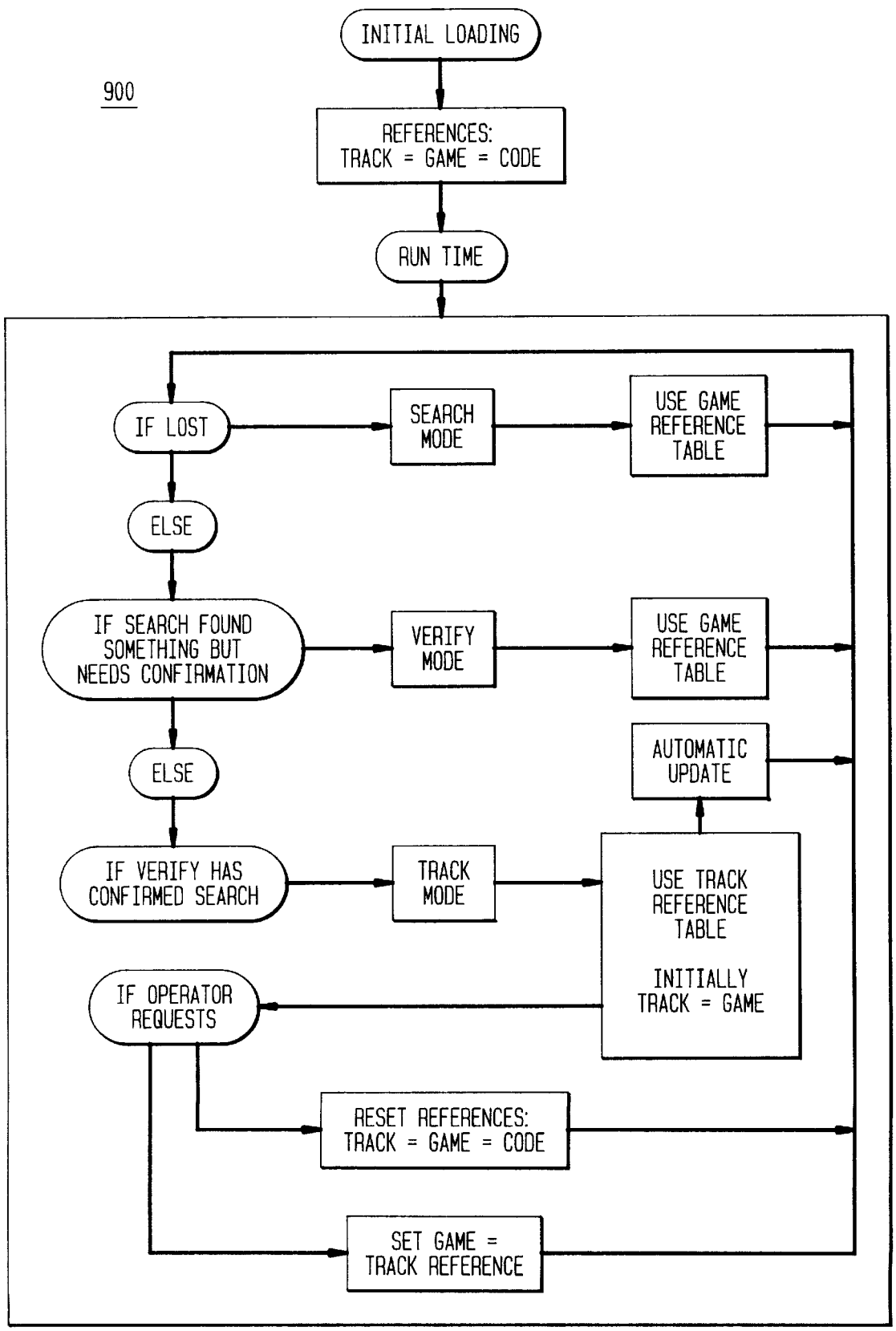
FIG. 9 is a flow diagram showing the use of the code, game and track reference data according to the preferred embodiment of the invention.

The final key is used to mix the warped logo images and the live video stream, as shown diagrammatically in FIG. 8. The same key and mask combination is used for the Y, U and V components of the video mixing and is obtained in the following manner. The logo key 805 is warped into the pose of the current image 810. Likewise, the synthetic reference image 815 is warped into the pose of the current image 820 where it is adjusted for color and luminance 830 before being differenced 835 with the current image 825. The difference image 840 is then filtered into an occlusion mask 845. This occlusion mask 845 is then combined 850 with the warped logo key 810 yielding conditional key 855. The conditional key 855 is filtered and adjusted for color and luminance resulting in final key 860. The final key 860, the current image 825, and the warped logo 870 are mixed 875 together yielding the broadcast signal 880 containing the inserted indicia in the current image processed for occluding objects.

In order to make television signals appear sharper, all television systems employ a technique called peaking. This is a non-linear process whereby the output of the pickup devices in a camera go through a peaking filter which produces light and dark edges around objects that contrast with the background. This is a visually pleasing effect which makes the whole image appear sharper to the eye. The problem this presents for occlusion processing is that this peaking produces visible halos around objects that overlap the insertion.

One solution is to perform edge processing techniques using spatial or morphological filters to remove the halos.

Figure 13:
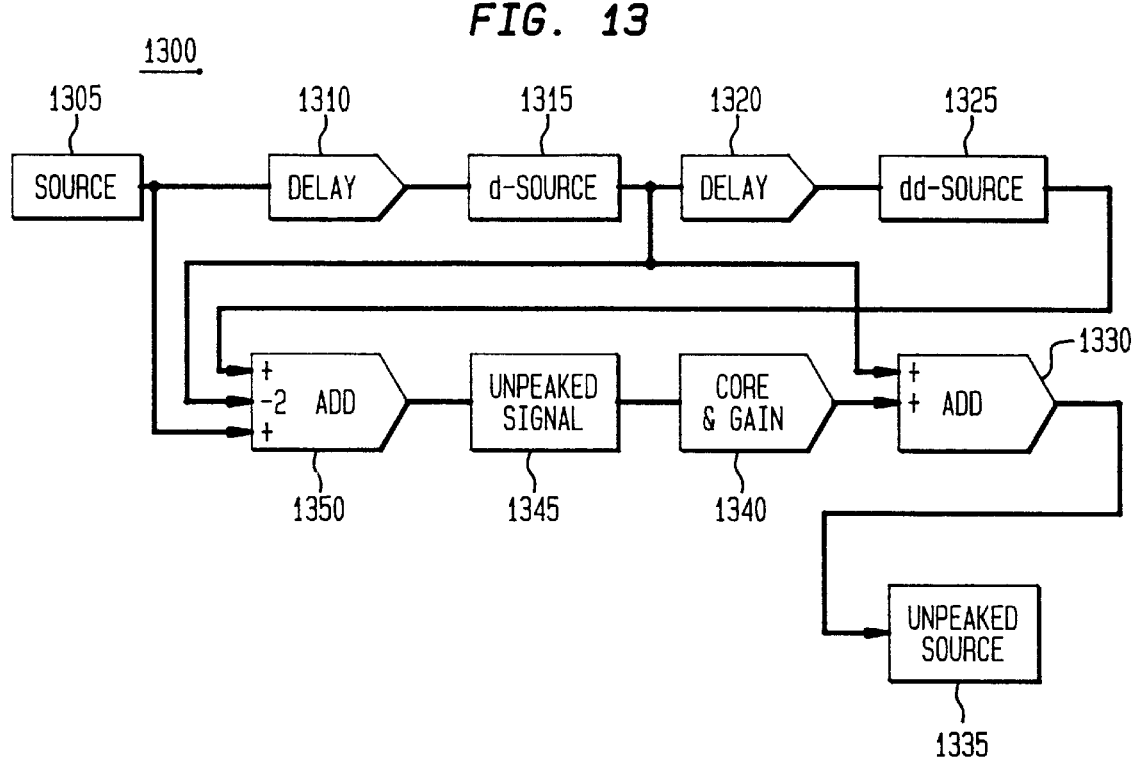
FIG. 13 illustrates an unpeaking circuit for reducing the visible halos around objects which overlap an insertion according to the preferred embodiment of the invention.
Figure 14:
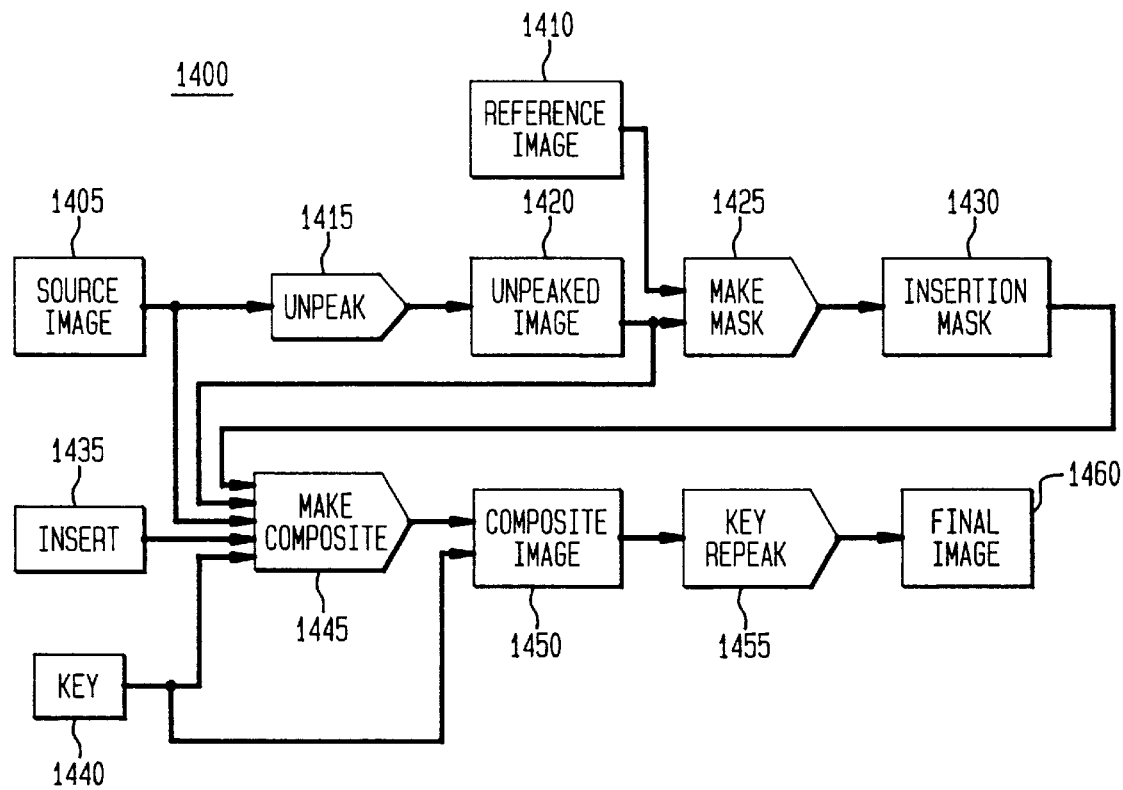
FIG. 14 illustrates a repeaking circuit for providing the enhanced contrast of a peaked signal without the undesirable halo effects according to the preferred embodiment of the invention.

Another solution to this is an unpeaking circuit as shown in FIGS. 13 and 14. The input video or source 1305 is unpeaked horizontally and vertically. The horizontal unpeaking is on a line by line basis by two separate delays 1310 and 1320. The source with a single delay 1315 is inverted and amplified by a factor of two and added to both the original source 1305 and the source with a double delay 1325. This results in an unpeaked signal 1335. A coring operation 1340 (i.e. thresholding) is performed on this unpeaked signal 1335 and the appropriate amount of gain before it is added 1345 to the source delayed once 1315. The result is the horizontally unpeaked source 1350. The video then passes through a vertical unpeaking circuit which is identical to the horizontal unpeaking circuit except that the delays are one complete horizontal scan line rather than a few nanoseconds. The unpeaking circuit of FIG. 13 is then used in the system as shown in FIG. 14. After unpeaking the source, the entire insertion process is done as described previously. The "make composite" process 1445 uses the unpeaked image 1420 only in the key area. The "key repeak" process 1455 subsequently peaks this region to match the source image peaking. FIG. 14 shows one way in which peaking can be dealt with. Other ways include combining the mask, insert and unpeaked source, then repeak and put into source.

In normal operation the horizontal peaking delay is such that the visual appearance of the horizontal peaking matches that of the vertical peaking. The default value of the horizontal peaking delay is this value. The actual value may be adjusted by the operator or automatically adjusted in order to obtain a more accurate unpeaking of the input video signal.

In a further enhancement of the method, designed to allow for occlusion over backgrounds which have stationary patterns with a finite number of distinct colors, such as an in-stadium advertising billboard, there are multiple synthetic reference images. In the region of the synthetic reference image in which the in-stadium patterned object occurs, each of the synthetic reference images has a low-frequency representation of the object in one of the principle colors of the billboard, as shown diagrammatically in FIGS. 12A–12C. The difference image in each of the channels is just the minimum of the difference between the current image and the various alternate versions of the synthetic reference images.

For example, in the luma or Y channel, if there is an object with a pattern in two well defined colors, such as an advertising billboard with red writing on a white background, there would be two different synthetic images, Y_SRI_1 and Y_SRI_2. For each pixel, ΔY would then be the minimum of the two differences of the current Y compared to each of the Y_SRI_1 and Y_SRI_2. Similar difference images would be calculated for all the other channels being used, such as U, V, hue, and texture or variance, and the result combined into a single composite difference image, either by representing them as a euclidian distance in terms of all the channels, or by picking the maximum difference for each channel, or by some combination of the two methods. Obviously, weighting and adjustment for current image changes in overall illumination or camera adjustments could be done in a manner analogous to that detailed for the simpler case of a single synthetic reference image.

An alternative, though functionally equivalent, way to think of this enhancement, is to say that instead of a single value attached to each pixel of the Y synthetic reference image, there is a range (or a number of sets of ranges) of values attached to each pixel, and the difference between the current Y value and the synthetic, Y image for each pixel is the minimum of the current value and any of the sets of synthetic reference Y values for that pixel and likewise for all the other channels being considered in the occlusion process. One may also think of the range of values as being a change in the difference thresholds for each pixel.

The range of values is necessary even if a billboard is a simple red on white because there will be pixels on the edge of the pattern which are a combination of red and white, i.e. a range of pinks. More values for comparison increases the chance of falsely missing occlusion because the occluding object has values of one of the reference values, thus, it is important to minimize the extent to which the values are smeared out, consistent with any errors associated with the image warping hardware in the system.

Figure 12A:
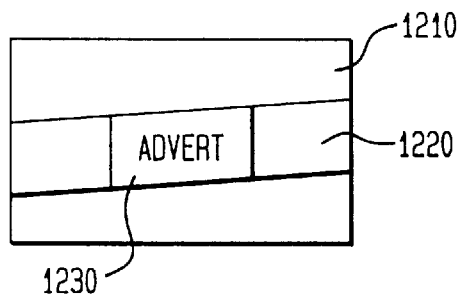
FIGS. 12A–12C illustrate the use of multiple synthetic reference images for replacing a patterned object within a scene.
Figure 12B:
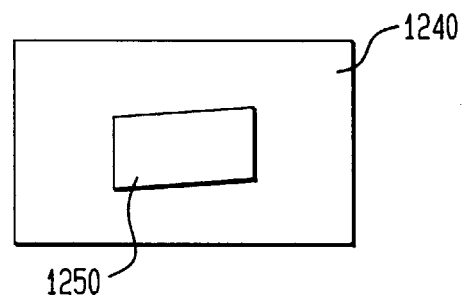
Figure 12C:
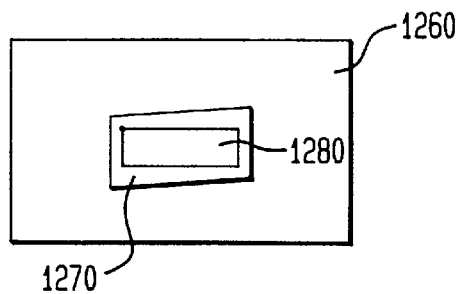

An example of the use of multiple synthetic reference images is shown in FIGS. 12A–12C in which the actual reference scene in FIG. 12A contains a view of a back wall 1220 in a stadium 1210. On the back wall 1220, there is a sign 1230, consisting of writing in color a on a background color b. The two reference images used to perform the occlusion processing over such a sign are shown diagrammatically in FIGS. 12B and 12C as synthetic reference image 1 and synthetic reference image 2 respectively. Synthetic reference image 1 is divided into two regions, one of which 1240 has the reference values associated with the back wall 1220, while the second region 1250 has values associated with the background color b of the sign 1230. The region 1250 is slightly larger than the sign 1230 to allow for errors in the warping process. The second reference image, synthetic reference image 2, has three regions. Region 1260 has values associated with the back wall 1220, while the region 1270 has values associated with the background color b and region 1280 has values associated with the color a in which the advertising is written. Region 1270 is now smaller than the sign, while region 1280 is slightly larger than the region of the written advert, again to allow for impression in the warping process. The colors associated with the background wall can be any one of three representations, i.e. actual values, which may be spatially or temporarily averaged or both, with the thresholds being constants specified elsewhere, or the values may be arrays of values associated with each pixel, representing ranges of allowed values at that pixel position, or they may contain an actual value, which may be spatially or temporarily averaged or both and an allowable threshold range at that pixel position. If a Euclidian distance approach is used only one threshold value is necessary at any given pixel position, but if a low and high threshold approach is used then more than one threshold value may be necessary at each point. Depending on the details of implementation, multiple synthetic reference images could be used, or a single synthetic reference image with an array of values attached to each pixel position could be used.

The present invention is advantageous over the prior art in several ways. First, this system of occlusion processing is usable in a multi-colored environment. That is, it is not limited to a single background color like "blue screen" technology. Second, the system is robust with respect to warper error. Third, the system is robust with respect to pixel aliasing. Pixel aliasing refers to the fact that pixel values for a shifted camera position can not be exactly obtained. Rather, they must be approximated. Fourth, the system automatically adjusts to changing lighting and camera conditions during real time operation. This is significant in that live broadcasted events frequently start in daylight and finish at night under artificial light. The system continually adjusts itself for the changing light conditions including twilight. Fifth, the system does not obscure any of the action of an event and even allows the structures and markings of the playing field, i.e. white chalk lines, to show through the inserted images. Sixth, the system uniquely allows a blend of the inserted image into the current image even when there is no occlusion present. This provides a natural texture to the viewer which improves the illusion that the inserted image is actually present at the event being broadcast. Lastly, one embodiment of the system permits occlusion processing over patterned backgrounds.

While the invention has been described with reference to the preferred embodiment thereof, it will be appreciated by those of ordinary skill in the art that various modifications can be made to the structure and function of individual parts of the system without departing from the spirit and scope of the invention as a whole.

We claim:

1. A method of occlusion processing for merging an inserted image with a current image in a live broadcast of an event, the method comprising the steps of:
   (a) obtaining a reference image of a scene, said scene including at least one intended insertion region;
   (b) processing the reference image to obtain a synthetic reference image;
   (c) warping the synthetic reference image into the current image using warp parameters which transform the synthetic reference image to the same size and perspective as the current image;
   (d) updating the warped, synthetic reference image to reflect camera and lighting conditions in the current image;
   (e) creating a difference image by subtracting the updated, warped, synthetic reference image from the current image;
   (f) creating an occlusion mask from said difference image for deciding whether to broadcast the pixels of the current image, the pixels of the inserted image, or a mixture of each; and
   (g) mixing the inserted image and the current image according to the occlusion mask to obtain a broadcast image which seamlessly blends the inserted image into a portion of the current image without obscuring the action of the event.

2. The method of claim 1 wherein said synthetic reference image and said current image include sensor points that provide color and luminance information for dynamically adjusting the color and intensity of the warped, synthetic reference image to reflect camera and lighting conditions in the current image.

3. The method of claim 2 wherein said sensor points comprise array sensor points and distributed sensor points, said array sensor points dispersed throughout the intended insertion region, and said distributed sensor points dispersed outside of the intended insertion region.

4. The method of claim 3 wherein said updating step (d) further comprises the steps of:
   (h) averaging the values of the sensor points in the current image to obtain an average value;
   (i) creating three additional average values of reference sensor points based on the average value of the sensor points of the current image, said three additional average values comprising a code reference average value, a game reference average value, and a tracking reference average value, wherein each additional average value is initially set equal to the average value of the warped, synthetic reference image sensor points;
   (j) updating the game reference average value periodically to reflect any changes in the overall lighting conditions;
   (k) updating the tracking reference average value on a field to field basis;
   (l) comparing the updated tracking reference average value against each warped array sensor point value in the current image yielding a sensor point difference value;
   (m) comparing the sensor point difference value against a threshold value to determine whether and how many current image array sensor points have been occluded by objects in the current image wherein,
      if a sufficient percentage of the array sensor points remain unoccluded then using said unoccluded array sensor points for updating the warped, synthetic reference image for this field,
      if an insufficient percentage of the array sensor points remain unoccluded then using the distributed sensor points for updating the warped, synthetic reference image for this field provided a sufficient percentage of the distributed sensor points remain unoccluded,
      if an insufficient percentage of the array sensor points remain unoccluded and there is an insufficient percentage of unoccluded distributed sensor points then,
         calculating the variances of up to three subsets of the occluded array sensor points,
         comparing the variance values to a threshold value for the intended insertion region and if any of said variance values is within said threshold value then using the occluded array sensor points for updating the warped, synthetic reference image for this field,
      otherwise no updating is done for this field;
   (n) averaging the usable current image sensor points;
   (o) subtracting the average value of the current image sensor points from the average value of the usable warped, synthetic reference image sensor points yielding an average sensor point difference value; and
   (p) updating each pixel of the warped, synthetic reference image using the magnitude of the average sensor point difference value.

5. The method of claim 4 wherein said creating a difference image step (e) further comprises the steps of:
   (q) obtaining difference images for each of the Y, U, and V color components by subtracting the Y color component of the updated, warped, synthetic reference image from the Y color component of the current image, subtracting the U color component of the updated, warped, synthetic reference image from the U color component of the current image, and subtracting the V color component of the updated, warped, synthetic reference image from the V color component of the current image; and
   (r) forming a composite difference image from each of the Y, U, and V difference images.

6. The method of claim 5 wherein said creating an occlusion mask step (f) further comprises the steps of:
   (s) clipping the composite difference image according to operator specified high and low clipping values;
   (t) filtering, with a two dimensional low pass filter, the clipped composite difference image in order to reduce errors due to noise;
   (u) mapping all values of the filtered clipped composite difference image less than the operator specified low clipping value to a maximum transparency value so that the inserted image pixel will show through, mapping all values greater than the operator specified high clipping value to a minimum transparency so that the inserted image pixel is occluded, and linearly mapping all values within the operator specified high and low clipping values to a corresponding transparency percentage to obtain the occlusion mask.

7. The method of claim 6 further comprising the step of low pass filtering the occlusion mask to smooth off edges to avoid introducing unwanted high frequency components into the broadcast.

8. The method of claim 7 further comprising the step of altering by erosion or expansion the occlusion mask to adjust for artifacts introduced by unwanted inherent video effects.

9. The method of claim 8 further comprising the step of filtering the occlusion mask in two dimensions in order to group occluded pixels so that each occluded pixel has one or more occluded neighbors.

10. The method of claim 9 further comprising the step of temporally filtering the occlusion mask over one or more fields so that changes in the mask exhibit continuity over time.

11. The method of claim 10 wherein mixing the inserted image and current image according to the occlusion mask to obtain a broadcast image which seamlessly blends the inserted image into a portion of the current image without obscuring the action of the event comprises the steps of:
(v) combining the occlusion mask with a warped logo key to obtain a conditional key; and
(w) creating a final key which is used to mix the warped inserted image and the current image by adjusting the transparency of the conditional key to create a more realistic broadcast image.

12. The method of claim 11 wherein said averaging step (n) further comprises the step of weighting each usable sensor point according to its distance from the updated tracking reference average value.

13. The method of claim 12 wherein said forming step (r) is accomplished according to the relationship:

$$S=(w_y \Delta Y^2 + w_c(\Delta U^2 + \Delta V^2))^{1/2}$$

where S is the composite difference image,
$w_y$ and $w_c$ are weighting factors, and
$\Delta Y$, $\Delta U$, and $\Delta V$ are the difference images for the Y,U, and V color components.

14. The method of claim 12 wherein said forming step (r) is accomplished according to the relationship:

$$S=(w_y \Delta Y^2 w_u \Delta U^2 + w_v \Delta V^2)^{1/2}$$

where S is the composite difference image,
$w_y$, $w_u$ and $w_v$ are weighting factors, and
$\Delta Y$, $\Delta U$, and $\Delta V$ are the difference images for the Y,U, and V color components.

15. The method of claim 12 wherein said obtaining step (q) further comprises the step of obtaining a hue difference image by subtracting the hue of the updated, warped, synthetic reference image from the hue of the of the current image wherein hue is equal to arctan(U/V).

16. The method of claim 15 wherein said hue difference image is used as the composite difference image.

17. The method of claim 15 wherein said hue difference image is used in addition to the Y, U, and V color channels in forming the composite difference image.

18. The method of claim 12 wherein said obtaining step (q) further comprises the step of obtaining a texture difference image.

19. The method of claim 18 wherein said texture difference image is obtained from a variance of each pixel with respect to its eight nearest neighbors.

20. The method of claim 18 wherein said texture difference image is obtained from a variance of each pixel with respect to an average value.

21. The method of claim 1 wherein said current image is a filtered synthetic, representation of the actual current image.

22. The method of claim 5 wherein multiple synthetic reference images are obtained for a multi-colored intended insertion region, each synthetic reference image being a representation of a different color of said multi-colored intended insertion region and said composite difference image being formed from the difference image of the updated, warped, synthetic reference image which yields the minimum average sensor point difference value with respect to the current image.

23. The method of claim 1 further comprising the step of horizontally and vertically unpeaking the current image, said unpeaking comprising the steps of:
(x) delaying the current image signal by a time t;
(y) inverting said delayed current image signal;
(z) amplifying said inverted, delayed current image signal by multiplying with a gain of 2;
(aa) adding said amplified, inverted, delayed current image signal to a double delayed current image signal and to the current image signal yielding an unpeaking current image signal;
(bb) thresholding the unpeaking signal by removing all signals below a low threshold amplitude and decreasing all signals above a high threshold value to the high threshold value;
(cc) changing the gain of the thresholded signal; and
(dd) adding the gain adjusted thresholded unpeaking signal to the delayed current image signal to produce an unpeaked current image signal, wherein said steps (x) through (dd) are executed succesively for horizontal and vertical unpeaking.

24. The method of claim 23 wherein t is equal to a single horizontal scan line for vertical unpeaking and less than a single horizontal scan line for horizontal unpeaking.

25. A system for merging an inserted image with a current image in a live broadcast of an event while compensating for occluding objects in the foreground of the current image, the system comprising:
camera means for obtaining a reference image of a scene, said scene including an intended insertion region;
processor means for processing the reference image to obtain a synthetic reference image;
warping means for warping the synthetic reference image into the current image using warp parameters which transform the synthetic reference image to the same size and perspective as the current image;
updating means for updating the color and intensity of the warped, synthetic reference image to reflect camera and lighting conditions in the current image;
comparator means for creating a difference image by subtracting the updated, warped, synthetic reference image from the current image;
masking means for creating an occlusion mask from said difference image for deciding whether to broadcast the pixels of the current image or the pixels of the inserted image; and
mixing means for mixing the inserted image and the current image according to the occlusion mask to obtain a broadcast image which seamlessly blends the inserted image into a portion of the current image without obscuring the action of the event.

26. The system of claim 25 wherein said synthetic reference image and said current image include sensor points that provide color and luminance information for dynamically adjusting the color and intensity of the warped, synthetic reference image to reflect camera and lighting conditions in the current image.

27. The method of claim 26 wherein said sensor points comprise array sensor points and distributed sensor points, said array sensor points dispersed throughout the intended insertion region, and said distributed sensor points dispersed outside of the intended insertion region.

28. The method of claim 27 wherein said updating means further comprises:

sensor point averaging means for averaging the sensor points of the warped, synthetic reference image to obtain an average value;

reference creation means for creating three additional average values of reference sensor points based on the average value of the sensor points of the warped, synthetic reference image, said three additional average values comprising a code reference average value, a game reference average value, and a tracking reference average value, wherein each additional average value is initially set equal to the average value of the warped, synthetic reference image sensor points;

game reference updating means for updating the game reference average value periodically to reflect any changes in the overall lighting conditions;

tracking reference updating means for updating the tracking reference average value on a field to field basis;

tracking reference comparing means for comparing the updated tracking reference average value against each warped, synthetic reference image array sensor point value yielding a sensor point difference value;

sensor point comparing means for comparing the sensor point difference value against a threshold value to determine whether and how many warped, synthetic reference image array sensor points have been occluded by objects in the current image wherein, if a sufficient percentage of the array sensor points remain unoccluded then using said unoccluded array sensor points for updating the warped, synthetic reference image for this field, if an insufficient percentage of the array sensor points remain unoccluded then using the distributed sensor points for updating the warped, synthetic reference image for this field provided a sufficient percentage of the distributed sensor points remain unoccluded, if an insufficient percentage of the array sensor points remain unoccluded and there is an insufficient percentage of unoccluded distributed sensor points then, calculating the variances of up to three subsets of the occluded array sensor points, comparing the variance values to a threshold value for the intended insertion region and if any of said variance values is within said threshold value then using the occluded array sensor points for updating the warped, synthetic reference image for this field, otherwise no updating is done for this field;

averaging means for averaging the usable warped, synthetic reference image sensor points;

subtraction means for subtracting the average value of the current image sensor points from the average value of the usable warped, synthetic reference image sensor points yielding an average sensor point difference value; and pixel updating means for updating each pixel of the warped, synthetic reference image using the magnitude of the average sensor point difference value.

29. The method of claim 28 wherein said means for creating a difference image further comprises:

differencing means for obtaining difference images for each of the Y, U, and V color components by subtracting the Y color component of the updated, warped, synthetic reference image from the Y color component of the current image, subtracting the U color component of the updated, warped, synthetic reference image from the U color component of the current image, and subtracting the V color component of the updated, warped, synthetic reference image from the V color component of the current image; and forming means for forming a composite difference image from each of the Y, U, and V difference images.

* * * * *